United States Patent Office 3,450,695
Patented June 17, 1969

3,450,695
BENZODIAZEPINE COMPOUNDS AND
METHODS FOR THEIR PRODUCTION
Leo Henryk Sternbach, Upper Montclair, and Arthur
Stempel, Teaneck, N.J., assignors to Hoffman-La
Roche Inc., Nutley, N.J., a corporation of New Jersey
No Drawing. Filed Jan. 19, 1967, Ser. No. 610,249
Int. Cl. C07d 53/06; A61k 27/00
U.S. Cl. 260—239.3                                     8 Claims

ABSTRACT OF THE DISCLOSURE

New and novel 5-phenyl-2H-1,4-benzodiazepin-2-ones which are etherified in the 3 position with an aminoalkyl or haloalkyl moiety. These new and novel benzodiazepin-2-ones are useful as anticonvulsants, muscle relaxants and sedatives.

BACKGROUND OF THE INVENTION

This invention relates to novel benzodiazepine compounds and methods for their preparation. More particularly, this invention relates to 5-phenyl-2H-1,4-benzodiazepine which are etherified with an amino alkyl or halo alkyl moiety in the 3 position and to a method for their preparation.

SUMMARY OF THE INVENTION

The novel compounds of this invention are selected from the group consisting of those of the formulas:

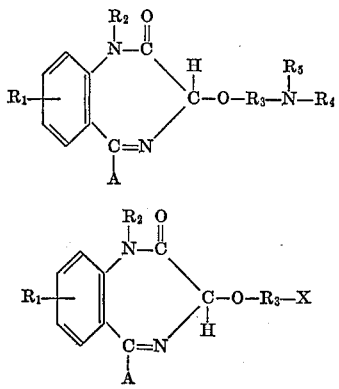

wherein $R_1$ is selected from the group consisting of hydrogen, lower alkyl, halogen, trifluoromethyl, and nitro, $R_2$ is selected from the group consisting of hydrogen and lower alkyl, $R_3$ is alkylene containing from 2 to 7 carbon atoms with a straight carbon chain length of at least 2, preferably ethyl or propyl, $R_4$ and $R_5$ are lower alkyl, preferably methyl or ethyl, A is selected from the group consisting of phenyl, halo-phenyl, lower alkyl, phenyl and pyridyl and X is a halogen, and their pharmaceutically acceptable salts.

The term lower alkyl includes both straight and branched chain groups having from 1 to 7 carbon atoms such as methyl, ethyl, propyl, isopropyl, and the like. The term halogen includes bromine, chlorine, fluorine and iodine. The preferred benzodiazepin-2-ones of Formulae I and II above are the 7-substituted benzodiazepin-2-ones wherein $R_1$ in the 7 position is either a halogen, trifluoromethyl or nitro. When $R_1$ is a halogen in the 7 position, the preferred halogens are chlorine and bromine. In Formula II above, the preferred halogen which is on the ether group in the 3-position of the benzodiazepin-2-one is either bromine or iodine.

In accordance with this invention, A can be a phenyl radical such as mono fluoro-phenyl, mono chloro-phenyl, etc. Furthermore, A can be a pyridyl radical such as 2-pyridyl. When A is a phenyl radical, the preferred radical is either phenyl or orthochloro phenyl. When A is a pyridyl radical, the preferred radical is 2-pyridyl.

The compounds of Formulas I and II above form pharmaceutically acceptable acid addition salts with both inorganic and organic pharmaceutically acceptable acids, such as hydrochloric acid, hydrobromic acid, sulfuric acid, phosphoric acid, citric acid, acetic acid, succinic acid, maleic acid, methane sulfonic acid, para toluene-sulfonic acid and the like. Such acid addition salts are also within the scope of the invention.

The compound of Formula II above can be prepared from a compound of the formula:

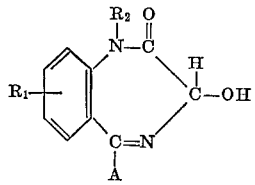

wherein $R_1$, $R_2$ and A are as above, by first treating the compound of the Formula III above with a halogenating agent to form the corresponding 3-halo derivative and then treating this 3-halo derivative with a mono hydroxy-mono halo substituted alkane with the hydroxy substituted on a different carbon atom than the halo group. The compound of Formula II above can be converted to the compound of Formula I above by reacting the compound of Formula II with a dilower alkyl substituted amine.

The compounds of Formulae I and II above are useful as anticonvulsants, muscle relaxants and sedatives. The compounds of Formulae I and II above, as well as their pharmaceutically acceptable acid addition salts, are used in the form of conventional pharmaceutical preparations which contain said compounds in connection with conventional pharmaceutical organic or inorganic carrier materials suitable for internal administration. The pharmaceutical compositions containing the compounds of Formulae I and II above, as well as their pharmaceutically acceptable acid addition salts, can be administered parenterally or orally. Dosages can be adjusted to individual requirements, for example, these compounds can be administered in dosages of from about 0.1 mg./kg. to about 100 mg./kg. per day. These dosages can be administered in single dosage form or in divided dosage forms. The pharmaceutical compositions can contain such conventional organic or inorganic inert carrier materials such as water, gelatin, lactose, starch, magnesium stearate, talc, vegetable oils, gums, polyalkylene glycols, Vaseline or the like. The pharmaceutical preparations can be in conventional solid forms such as tablets dragees, suppositories, capsules or in conventional liquid forms such as solutions, suspensions or emulsions. The pharmaceutical compositions can be submitted to conventional pharmaceutical expedients such as sterilization and/or can contain conventional pharmaceutical additives such as preservatives, stabilizing agents, wetting agents, emulsifying agents, salts for adjusting the osmotic pressure, buffers or the like. They can also contain other therapeutically useful materials.

DETAILED DESCRIPTION OF THE INVENTION

The compound of Formula III above can be converted into the compounds of Formulas I and II above by means of the following reaction scheme:

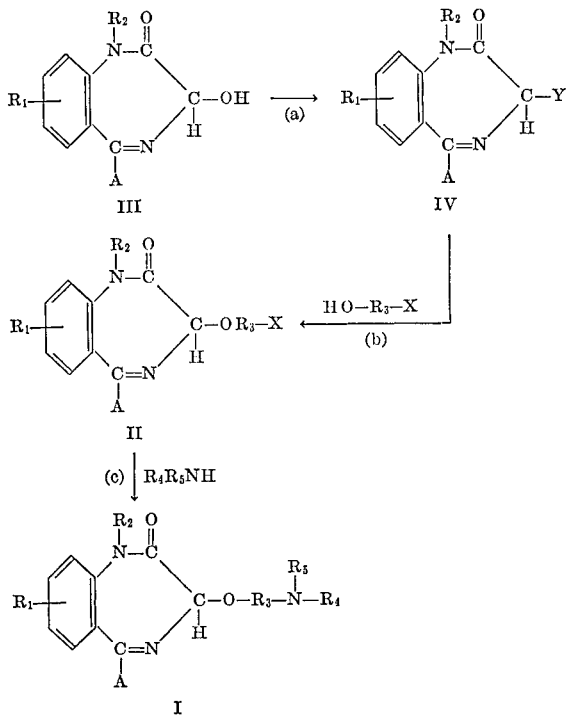

wherein $R_1$, $R_2$, $R_3$, $R_4$, $R_5$, A and X are as above, and Y is a halogen.

The 3-hydroxy compound of Formula III above can be converted to the corresponding 3-halo derivatives of Formula IV above by treatment with a halogenating agent such as an inorganic acid halide. Typical inorganic acid halides which can be utilized in accordance with this invention include thionyl chloride, thionyl bromide, phosphorous pentachloride, phosphorous pentabromide, etc. Generally, it is preferred to carry out the reaction of step (a) in an inert organic solvent. Any conventional inert organic solvent can be utilized as the reaction medium in accordance with this invention. Included among the solvents suitable for the purpose of the present invention, are hydrocarbons, such as benzene, toluene, xylene and the like; chlorinated hydrocarbons such as ethylene chloride, chlorobenzene and the like; ethers such as tetrahydrofuran, diethyl ether, dioxane and the like, or any other suitable solvent. In carrying out this reaction, temperature and pressure are not critical and the halogenation reaction can be effected at room temperature and at atmospheric pressure or at elevated temperature and/or reduced pressure. Generally, in carrying out this reaction, it is preferred to heat the reaction medium to the reflux temperature of the solvent.

The conversion of the 3-halo compounds of the Formula IV to the etherified compounds of the Formula II is carried out, as in step (b), by treating the compounds of the Formula IV above with a mono halo-mono hydroxy substituted alkane containing from 2 to 7 carbon atoms wherein the halo group is substituted on a different carbon atom than the hydroxy group. Among the preferred alkanes are those alkanes wherein the hydroxy group is substituted on one of its terminal carbon atoms and the halogen group is substituted on the other terminal carbon atom. Typical alkanes which can be utilized in accordance with this invention are 3-bromo propanol, 2-bromo propanol, 3-chloro propanol, 1-bromo-2-hydroxy ethane, 1-chloro-3-hydroxy pentane, 2-bromo pentanol, 5-chloro hexanol, etc. The reaction of step (b) is generally carried out in the presence of an inert organic solvent such as tetrahydrofuran. Any conventional inert organic solvent such as the solvents hereinbefore mentioned can be utilized in carrying out step (b) in accordance with this invention. In carrying out this reaction, temperature and pressure are not critical and this reaction can be effected at room temperature and at atmospheric pressure or at elevated temperatures and/or reduced pressure. Generally, it is preferred to carry out this reaction at temperatures of from about 25° C. to about 100° C., depending upon the boiling temperature of the solvent.

The conversion of the compound of Formula II above to the compound of Formula I above, as in step (c), is carried out by treating the compound of Formula II above with a dilower alkyl substituted amine. Any dilower alkyl substituted amine can be utilized in carrying out this reaction. Typical amines which can be utilized, in accordance with this invention, include diethylamine, diisopropylamine, monoethylmonoisopropylamine, methylethylamine, dimethylamine etc. Generally, it is preferred to carry out the reaction of step (c) in the presence of an inert organic solvent such as acetone. Any conventional inorganic inert solvent such as those hereinbefore mentioned can be utilized in carrying out this reaction. In carrying out this reaction, temperature and pressure are not critical and the reaction of step (c) can be effected at room temperature and at atmospheric pressure or at elevated temperatures and/or reduced pressure. Generally, it is preferred to carry out this reaction at a temperature of from about 25° C. to about 100° C., depending upon the boiling temperature of the solvent.

The following examples are illustrative but not limitative of the present invention. All temperatures in the examples are in degrees centigrade.

Example 1

This example is directed to the preparation of 3-acetoxy - 7-chloro - 1,3 - dihydro-1-methyl-5-phenyl-2H-1,4-benzodiazepin-2-one.

A suspension of 398 g. of 7-chloro-1-methyl-5-phenyl-3H-1, 4-benzodiazepin-2(1H)-one 4-oxide in 2 l. acetic anhydride was heated and stirred on the steam bath for 45 minutes. The reaction mixture was cooled to about 10° and the reaction product, 3-acetoxy-7-chloro-1,3-dihydro-1-methyl-5-phenyl-2H-1,4-benzodiazepin - 2 - one, melting at 263–5° was separated by filtration.

Example 2

This example is directed to the preparation of 7-chloro-1,3 - dihydro-3-hydroxy-1-methyl-5-phenyl-2H-1,4-benzodiazepin-2-one.

To a stirred suspension of 204 g. of 3-acetoxy-7-chloro-1, 3-dihydro-1-methyl-5-phenyl-2H-1,4-benzodiazepin-2-one in 4.5 l. dioxane was added 60 ml. of concentrated hydrochloric acid. The reaction mixture was stirred at room temperature for 17 hours and the crystalline crude reaction product was separated by filtration. This product was suspended in 300 ml. of methylene chloride and treated with 200 g. of ice and 200 ml. of water. The mixture was then stirred until the product was completely dissolved in the methylene chloride. The organic layer was separated and the aqueous part extracted once more with methylene chloride. The organic layers were combined, dried over sodium sulfate, filtered and the filtrate concenrated in vacuo to dryness. The residue was crystallized from ether or a mixture of methylene chloride, ether and petroleum ether, and yielded 7-chloro-1,3-hydro - 3 - hydroxy-1-methyl-5-phenyl-2H-1,4-benzodiazepin-2-one. It was best recrystallized from large amounts of ether. The product is dimorphic. When crystallized from cyclohexane at 50° prisms are obtained melting at 115–16° C. Crystallized from ether the product forms needles melting at 120–2° C.

Example 3

This example is directed to the preparation of 3,7-dichloro-1,3-dihydro-1-methyl-5-phenyl-2H-1,4-benzodiazepin-2-one.

A solution of 11.9 g. of 7-chloro-1,3-dihydro-3-hydroxy-1-methyl-5-phenyl-2H-1,4-benzodiazepin-2-one in 200 ml. of methylene chloride was stirred and 4 ml. of thionyl chloride dissolved in 15 ml. of methylene chloride was added dropwise. The mixture was then heated to reflux for 1 hr., cooled to room temperature and then concentrated to dryness under reduced pressure. The residue was redissolved in methplene chloride and washed with a cold solution of sodium bicarbonate. After drying the organic phase over sodium sulfate, solvent was removed by distillation under reduced pressure and the residue crystallized from a mixture of methylene chloride and hexane. This yielded 3.7-dichloro-1,3-dihydro-1-methyl-5-phenyl-2H-1,4-benzodiazepin-2-one. This material was used without further purification.

Example 4

This example is directed to the preparation of of 3-(3-bromopropyloxy) - 7-chloro-1,3-dihydro-1-methyl-5-phenyl-2H-1,4-benzodiazepin-2-one.

To a solution of 10 gms. of 3,7-dichloro-1,3-dihydro-1-methyl-5-phenyl-2H-1,4-benzodiazepin-2-one in 100 ml. of tetrahydrofuran, 5 g. of 3-bromopropanol-1 were added and the mixture heated to reflux for 35 min. On addition of about 200 ml. of water, 3-(3-bromopropyloxy) - 7 - chloro-1,3-dihydro-1-methyl-5-phenyl-2H-1,4-benzodiazepin-2-one crystallized. Recrystallization from methyl ethyl ketone gave a pure product melting at 164–165°.

Example 5

This example is directed to the preparation of 7-chloro-3-(3-diethylaminopropoxy)-1,3-dihydro-1-methyl-5-phenyl-2H-1,4-benzodiazepin-2-one.

A solution of 5 g. of 3-(3-bromopropyloxy)-7-chloro-1,3-dihydro-1-methyl - 5 - phenyl-2H-1,4-benzodiazepin-2-one in 100 ml of acetone containing 2.5 ml. of ethylamine was heated to reflux for 2 hrs. Solvent was distilled off under reduced pressure and the residue was partitioned between ether and water. The aqueous layer was made alkaline with 40 percent sodium hydroxide and extracted with ether. After drying over sodium sulfate and removal of solvent by distillation, the residue was crystallized from methyl ethyl ketone of 7-chloro-3-(3-diethylaminopropoxy) - 1,3-dihydro-1-methyl-5-phenyl-2H-1,4 - benzodiazepin-2-one, melting at 153–154°. Further crystallization did not alter the melting point.

Example 6

Tablets were prepared containing the following ingredients per tablet—

| Ingredient: | Amount per tablet, mg. |
|---|---|
| 7-chloro-3-(3 - diethylaminopropoxy)-1,3-dihydro - 1-methyl-5-phenyl-2H-1,4-benzodiazepin-2-one | 5.00 |
| Dicalcium phosphate dihydrate, unmilled | 195.00 |
| Corn starch | 24.00 |
| Magnesium stearate | 1.00 |
| Total weight | 225.00 |

The procedure employed in preparing the tablets is as follows:

7-chloro-3(3-diethylaminopropoxy)-1,3 - dihydro - 1-methyl-5-phenyl-2H-1,4-benzodiazepin-2-one and corn starch were mixed together and passed through a No. 00 screen in Model "J" Fitz with hammers forward. This premix was then mixed with dicalcium phosphate and one-half of the magnesium stearate, passed through a No. 1A screen in Model "J" Fitz with knives forward and slugged. The slugs were passed through a No. 2A plate in a Model "D" Fitz at slow speed with knives forward, and the remaining magnesium stearate was added. The mixture was mixed and compressed to a tablet weight of 225 ml. using standard concave punches having a diameter of 5/16".

Example 7

Capsules were prepared containing the following ingredients per capsule—

| Ingredient: | Amount per capsule, mg. |
|---|---|
| 7-chloro-3-(3-diethylaminopropoxy)-1,3 - dihydro-1-methyl-5-phenyl-2H - 1,4 - benzodiazepin-2-one | 10 |
| Lactose, U.S.P. | 165 |
| Corn starch, U.S.P. | 30 |
| Talc, U.S.P. | 5 |
| Total net weight | 210 |

The procedure employed in preparing the capsule is as follows:

7-chloro-3-(3-diethylaminopropoxy)-1,3 - dihydro - 1-methyl-5-phenyl-2H-1,4-benzodiazepin-2-one, lactose and corn starch were mixed in a suitable mixer. The mixture was further blended by passing through a Fitzpatrick Comminuting Machine with a No. 1A screen with knives forward. The blended powder was returned to the mixer, the talc added and blended thoroughly. The mixture was filled into No. 4 hard shell gelatin capsules on a Parke Davis capsulating machine.

Example 8

A parenteral formulation was prepared containing the following ingredients per cc.—

| Ingredient: | | Amount per cc. |
|---|---|---|
| 7-chloro-3-(3diethylaminopropoxy)-1,3 - dihydro-1-methyl-5-phenyl-2H-1,4 - benzodiazepin-2-one | mg | 0.5 |
| Propylene glycol | cc | 0.4 |
| Benzyl alcohol (benzaldehyde free) | cc | 0.015 |
| Ethanol 95 percent USP | cc | 0.10 |
| Sodium benzoate | mg | 48.8 |
| Benzoic acid | mg | 1.2 |
| Water for injection q.s. | cc | 1.0 |

The procedure employed in preparing ten thousand cc. of the parenteral formulation is as follows:

5 gm. of 7-chloro-3-(3-diethylaminopropoxy)-1,3-dihydro-1-methyl-5-phenyl-2H-1,4-benzodiazepin-2-one were dissolved in 150 cc. of benzyl alcohol; 4,000 cc. of propylene glycol and 1,000 cc. of ethanol were added. Subsequently, 12 gm. of benzoic acid were dissolved in the above solution. Subsequently, 488 gm. of sodium benzoate dissolved in 3,000 cc. of water for injection were added. The solution was brought up to final volume of 10,000 cc. by the addition of water for injection. The parenteral dosage form was then filtered thru an 02 Selas candle, filled into suitable size ampuls, gassed with $N_2$ and sealed, The ampuls were then autoclaved at 10 p.s.i. for 30 minutes.

We claim:

1. A compound selected from the group consisting of

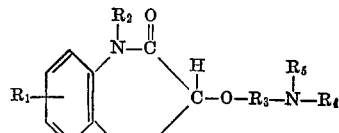

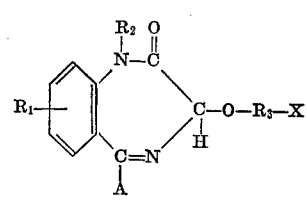

wherein $R_1$ is selected from the group consisting of hydrogen, lower alkyl, halogen, trifluoromethyl, and nitro, $R_2$ is selected from the group consisting of hydrogen and a lower alkyl, $R_3$ is an alkylene group containing from 2 to 7 carbon atoms with a straight carbon chain length of at least 2, $R_4$ and $R_5$ are lower alkyl groups, A is selected from the group consisting of phenyl, halo-phenyl, lower alkyl phenyl and pyridyl and X is a halogen, and pharmaceutically acceptable acid addition salts thereof.

2. The compound of claim 1 wherein $R_3$ is straight chain alklene.

3. The compound of claim 1 wherein said compound is 3-(3-bromopropyloxy)-7-chloro-1,3-dihydro-1-methyl-5-phenyl-2H-1,4-benzodiazepin-2-one.

4. The compound of claim 1 wherein said compound is 7-chloro-3-(3-diethylaminopropoxy) - 1,3 - dihydro - 1-methyl-5-phenyl-2H-1,4-benzodiazepin-2-one.

5. A process for producing 3-nitrogen containing ethers of 1,4-benzodiazepin-2-ones, said ethers having the formula:

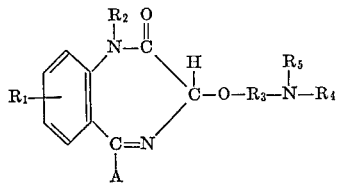

wherein $R_1$ is selected from the group consisting of hydrogen, lower alkyl, halogen, trifluoromethyl, and nitro, $R_2$ is selected from the group consisting of hydrogen and a lower alkyl $R_3$ is alkylene containing from 2 to 7 carbon atoms with a straight carbon chain length of at least 2, $R_4$ and $R_5$ are lower alkyl groups, and A is selected from the group consisting of phenyl, halophenyl, lower alkyl phenyl and pyridyl, which comprises treating a halo ether of the formula:

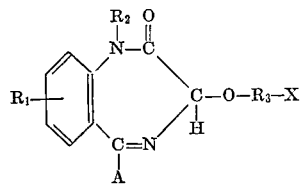

wherein $R_1$, $R_2$, $R_3$, and A are as above, and X is a halogen, with a dilower alkyl substituted amine.

6. The process of claim 5 wherein said halo ether is 3-(3-bromopropyloxy)-7-chloro - 1,3 - dihydro-1-methyl-5-phenyl-2H-1,4-benzodiazepin-2-one and said amine is diethyl amine.

7. A process for producing 3-nitrogen containing ethers of 1,4-benzodiazepin-2-ones, said ethers having the formula:

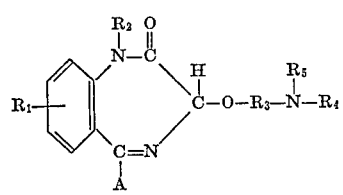

wherein $R_1$ is selected from the group consisting of hydrogen, lower alkyl, halogen, trifluoromethyl, and nitro, $R_2$ is selected from the group consisting of hydrogen and a lower alkyl $R_3$ is alkylene containing from 2 to 7 carbon atoms with a straight carbon chain length of at least 2, $R_4$ and $R_5$ are lower alkyl groups, and A is selected from the group consisting of phenyl, halo-phenyl, lower alkyl phenyl and pyridyl, which comprises treating a 3 halo substituted 1,4-benzodiazepine of the formula:

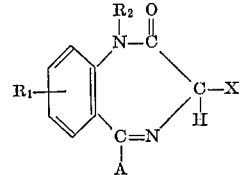

wherein $R_1$, $R_2$ and A are as above and X is a halogen, with mono hydroxy substituted mono halo substituted alkane containing from 2 through 7 carbon atoms and having the halo group substituted on a different carbon atom from that of the hydroxy group to produce a 3-halo ether, and thereafter treating said halo ether with a dilower alkyl amine.

8. A process of producing a 3-halo ether substituted 1,4-benzodiazepin-2-one of the formula:

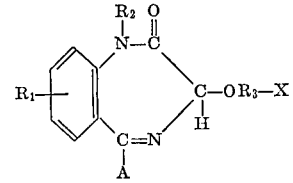

wherein $R_1$ is selected from the group consisting of hydrogen, lower alkyl, halogen, trifluoromethyl, and nitro, $R_2$ is selected from the group consisting of hydrogen and a lower alkyl, $R_3$ is alkylene containing from 2 to 7 carbon atoms with a straight carbon chain length of at least 2, A is selected from the group consisting of phenyl, halophenyl, lower alkyl phenyl and pyridyl and X is a halogen, which comprises treating a 3-halo substituted 1,4-benzodiazepin-2-one of the formula:

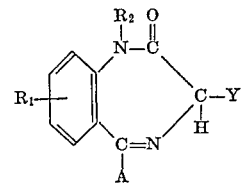

wherein $R_1$, $R_2$ and A are as above and Y is a halogen, with a mono hydroxy-mono halo substituted alkane containing from 2 to 7 carbon atoms and having the hydroxy substituted on a different carbon atom than the halo group to produce said 3-halo ether.

References Cited

UNITED STATES PATENTS 3,176,009  3/1965  Bell _____ 260—239.3
3,291,791  12/1966  Reeder et al. _____ 260—239.3

HENRY R. JILES, *Primary Examiner.*

R. T. BOND, *Assistant Examiner.*

U.S. Cl. X.R.

424—244